(12) United States Patent
Kitajima et al.

(10) Patent No.: US 7,373,806 B2
(45) Date of Patent: May 20, 2008

(54) SCANNING PROBE MICROSCOPE AND SCANNING METHOD

(75) Inventors: Itaru Kitajima, Chiba (JP); Kazutoshi Watanabe, Chiba (JP); Shigeru Wakiyama, Chiba (JP); Masatoshi Yasutake, Chiba (JP); Akira Inoue, Chiba (JP)

(73) Assignee: SII NanoTechnology Inc. (JP)

( * ) Notice: Subject to any disclaimer, the term of this patent is extended or adjusted under 35 U.S.C. 154(b) by 21 days.

(21) Appl. No.: 10/925,049

(22) Filed: Aug. 24, 2004

(65) Prior Publication Data
US 2005/0050947 A1    Mar. 10, 2005

(30) Foreign Application Priority Data
Aug. 25, 2003    (JP)    ............... 2003-299515

(51) Int. Cl.
G01B 5/28    (2006.01)
(52) U.S. Cl. ....................................... 73/105
(58) Field of Classification Search ................. 73/105; 250/306, 307
See application file for complete search history.

(56) References Cited
U.S. PATENT DOCUMENTS 5,801,381 A * 9/1998 Flecha et al. ............... 250/306
5,918,274 A * 6/1999 Chen et al. .................. 73/105
6,079,254 A * 6/2000 Chen et al. .................. 73/105
6,318,159 B1 * 11/2001 Chen et al. .................. 73/105

* cited by examiner

Primary Examiner—Robert Raevis
(74) Attorney, Agent, or Firm—Adams & Wilks

(57) ABSTRACT

A scanning probe microscope has a probe tip for undergoing a scanning operation to scan a sample surface in X- and Y-directions parallel to the sample surface and for undergoing movement in a Z-direction vertical to the sample surface. A vibration unit vibrates the probe tip at a vibration frequency that resonates with of forcedly vibrates the probe tip. An observation unit collects observational data from the sample surface when the probe tip is in proximity or contact with the sample surface. A detection unit detects a variation in the state of vibration of the probe tip when the probe tip is in proximity or contact with the sample surface during a scanning operation. A control controls scanning of the probe tip in the X- and Y-directions and movement of the probe tip in the Z-direction, and controls scanning of the probe tip in a direction parallel to the sample surface after the observational data is collected from the sample surface and until the probe tip reached a next observation position in the X- and Y-direction. During a scanning operation, the control unit controls the probe tip to move in the Z-direction away from the sample surface only when the detection unit detects a variation in the state of vibration of the probe tip.

26 Claims, 6 Drawing Sheets

SCANNING PROBE MICROSCOPE AND SCANNING METHOD

BACKGROUND OF THE INVENTION

1. Field of the Invention

The present invention relates to a scanning probe microscope and scanning method capable of obtaining information about the surface characteristics such as the surface topography of a sample by scanning a probe tip over a sample surface while vibrating the tip.

2. Description of the Related Art

As is well known in the art, scanning probe microscopes such as atomic force microscopes and scanning tunneling microscopes are known as instruments for measuring a sample such as an electronic material in a microscopic region and imaging the surface topography of the sample or measuring information about surface characteristics. Various kinds of instruments are offered as this type of scanning probe microscope. One known instrument is an ultra-low force atomic force microscope (AFM) for detecting the surface topography of a sample by scanning a probe tip parallel to a surface of the sample while vibrating the tip vertical to the surface (for example, see Patent Reference 1).

This ultra-low force AFM is equipped with a probe mounted at the front end of a lever arm. This probe can be scanned parallel to a sample surface. Furthermore, the tip of the probe can be vibrated at or near its resonant frequency.

In this ultra-low force AFM, when the surface topography of the sample is measured, scanning is performed while repeatedly tapping the sample surface by the probe vibrated as described above. Consequently, the vibration amplitude of the tip of the probe varies according to the topography (i.e., roughness) of the tapped sample surface. The ultra-low force AFM measures the surface topography of the sample by measuring the variations in the vibration amplitude.

The vibration amplitude of the probe tip is set to a sufficiently large value (e.g., 100 to 200 nm) to prevent the tip from adhering to the sample surface, for the following reason.

Under atmospheric conditions, a thin liquid layer, i.e., an adhesive water layer, exists on the surface of a substance due to moisture in the air. That is, as shown in FIG. 10, an adhesive water layer is also present on the sample surface. Therefore, when the probe tip is brought into proximity or contact with the sample, the amplitude gradually decreases while drawing a smooth curve as indicated by C1 in FIG. 11 by the effects of the force exerted between the tip and sample such as Van der Waals force. On the other hand, when the probe tip is moved away from the sample, the tip is captured by the surface tension of the adhesive water layer and pulled. Consequently, the tip draws an irregular curve C2 different from the curve C1. For this reason, it has been difficult to separate the probe tip from the adhesive water layer with small amplitudes. The probe tip is vibrated at large amplitudes as mentioned previously to solve this problem.

Furthermore, it is known that when a sample of deep topography is measured by the ultra-low force AFM, it is necessary to set the vibration amplitude large (more than 100 nm) as mentioned previously such that the tip can easily trace the topography (for example, see Non-Patent Reference 1).

In addition, where the topography of the sample has a steep incline, if the force with which the incline is tapped increases, slip produced on the incline increases (for example, see Non-Patent Reference 2). Also, lateral force undergoing from the incline increases bending of the probe and cantilever (lever arm).

In another known scanning probe microscope, when the probe tip is scanned parallel to a sample surface, the tip is kept at a distance sufficiently greater than the distance necessary for measurement of a physical property of the sample from the sample surface (for example, see Patent Reference 2).

This scanning probe microscope is equipped with a Z piezoelectric element for moving the probe vertical to the sample surface, the probe being capable of being scanned parallel to the sample surface. The Z piezoelectric element is elongated or shrunk by applying a voltage to it. Thus, the distance (or height) between the probe and sample surface can be adjusted. Usually, the Z piezoelectric element is shrunk when the tip is in a position sufficiently remote from the sample surface as mentioned previously. This position is set as the initial state.

In this scanning probe microscope, in a case where the surface topography of the sample is measured, the probe tip is scanned. When the tip reaches a measuring point, the scan is stopped and, at the same time, a voltage is applied to the Z piezoelectric element. Consequently, the Z piezoelectric element elongates to move the probe tip toward the sample surface. When the tip comes in close proximity to the sample surface and enters a tunnel area, a tunneling current flows between the probe tip and the sample. The microscope measures the current. After the measurement, the voltage applied to the Z piezoelectric element is set to 0 V. The Z piezoelectric element then shrinks back to its initial state. That is, the tip is in a position sufficiently more distant from the sample surface than a position giving the distance necessary for the measurement. After returning to this initial position, the tip is scanned again. Then, the microscope repeats the process described so far. The scanning probe microscope measures the surface topography of the sample by measuring the tunneling current at each measuring position.

Patent Reference 1: Japanese Patent Number 2732771 (paragraph numbers 0015-0037; FIGS. 1-11)

Patent Reference 2: Japanese Patent Number 2936545 (page 2, left column, from 16th line from below to page 2, right column, 5th line from above)

Non-Patent Reference 1: B. Anczykowski, et al., How to measure energy dissipation in dynamic mode atomic force microscopy, *Appl. Surf. Sci.*, 140 (1990), 376 (page 379, lines 16-Z26) Non-Patent Reference 2: T. Morimoto et al., Atomic Force Microscopy for High Aspect Ratio Structure Metrology, *Jpn. J. Appl. Phys.*, Vol. 41 (2002) 4238 (page 4240, left column, lines 9-17 and FIG. 8)

In the ultra-low force AFM described in the above-cited Patent Reference 1, scanning is performed at large amplitude while tapping the sample surface repeatedly such that the probe is not captured in the adhesive water layer on the sample surface. At this time, however, as described also in Non-Patent Reference 1, the dissipation energy produced by tapping the sample surface by means of the probe is in proportion to the squares of the vibration amplitude. Therefore, if the vibration amplitude is increased, there is the danger that a collision occurs between the probe and sample, producing a damage.

Furthermore, as described also in Non-Patent Reference 2, if the force with which the incline is tapped is increased, slip occurring on the incline increases. In addition, bending of the probe and cantilever due to lateral force undergoing from the incline increases. Therefore, it has been difficult to accurately measure the topography of a steep incline.

To eliminate this problem, if the vibration amplitude of the probe is reduced, the probe adheres to the sample surface. That is, the probe is captured in the adhesive water layer. This produces the problem that measurements cannot be made precisely.

Furthermore, if the scan rate is increased, the probe cannot follow the topography of the sample surface and thus it is difficult to make measurements precisely. Consequently, limitations are imposed on the scan rate. This deteriorates the throughput. In addition, it takes a long time to make measurements. Especially, where the scanned area is increased, the measuring time is increased.

Additionally, where the servo gain that is used as a parameter in controlling the distance between the probe and sample is increased, hunting oscillation occurs, making it difficult to perform precise measurements.

In the scanning probe microscope described in the above-cited Patent Reference 2, when the probe tip is scanned, the voltage applied to the Z piezoelectric element is set to 0 V. Scanning is performed after the tip has been returned to its initial position, i.e., the tip is placed sufficiently remotely from the sample surface. Therefore, the tip must move long distances in reciprocating between the tip and the sample surface. Hence, it takes long times to make movements. Therefore, it takes a long time to perform measurements. This produces the disadvantage that the throughput is deteriorated. Especially, since the probe tip is so set that it always returns to the same position (initial position) regardless of the topography of the sample surface, it may take a longer time according to the topography of the sample surface. In consequence, it also takes a longer time to perform measurements, and the throughput is deteriorated.

SUMMARY OF THE INVENTION

In view of the foregoing circumstances, the present invention has been made. It is an object of the invention to provide a scanning probe microscope and scanning method which can reduce or avoid damage due to collision between a probe tip and a sample, reduce the measuring time, improve the throughput, enhance the measuring accuracy, and collect observational data such as topographic data about a surface of the sample without being affected by an adhesive water layer.

A scanning probe microscope according to the present invention achieves the foregoing object and has a probe tip capable of scanning in X- and Y-directions parallel to a sample surface and moving in a Z-direction vertical to the sample surface, all relative to the sample surface. The microscope further includes: a vibration unit for vibrating the probe tip at a vibration frequency that resonates with or forcedly vibrates the tip; an observation unit for collecting observational data when the tip is in proximity or contact with the sample surface; a detection unit for detecting a variation in the state of vibration of the tip when the tip is in proximity or contact with the sample surface; and a control unit for controlling the scans in the X- and Y-directions and the movement in the Z-direction. The control unit scans the tip in a direction parallel to the sample surface after the observational data is collected and until the tip reaches a next observation position in the X- or Y-direction. When a variation in the state of vibration of the tip is detected during the scanning, the control unit moves the tip in the Z-direction away from the sample surface.

A scanning method according to the present invention is implemented by a scanning probe microscope having a probe tip capable of scanning in X- and Y-directions parallel to a sample surface and moving in a Z-direction vertical to the sample surface, all relative to the sample surface. The probe tip is vibrated at a vibration frequency that resonates with or forcedly vibrates the tip. When the tip is in proximity or contact with the sample surface, observational data is collected. The method starts with scanning the probe tip in the X- or Y-direction. When the tip reaches an observation position during the scanning, the scanning of the tip is stopped. At the same time, the tip is moved in the Z-direction toward the sample surface. During the movement of the tip, if a variation in the state of vibration of the tip is detected, the movement is stopped and the observational data is collected. When the variation in the state of vibration of the tip is detected during the scanning, the tip is moved in the Z-direction away from the sample surface.

In the scanning probe microscope and scanning method according to the invention, the scanning and collection of observational data are performed while vibrating the probe tip by the vibration unit. That is, the following operations are performed.

When the probe tip is moved from an observation position in the Z-direction toward the sample surface and the tip is brought into proximity or contact with the sample surface, a force (such as Van der Waals force or repulsive force due to contact) acts between the tip and sample. This force varies the state of vibration of the probe tip. When the variation is detected by the detection unit, the control unit stops the tip. At the same time, the observation unit collects observational data. After this observation step, the control unit performs a scanning step. That is, the tip is scanned in the X- and Y-directions parallel to the sample surface.

During this scanning step, if the tip comes close to a protrusion area of the sample surface, for example, the detection unit detects a variation in the state of vibration of the tip, e.g., attenuation of the vibration amplitude due to a Van der Waals force exerted between the tip and sample. In response to this, the control unit moves the tip in the Z-direction away from the sample surface. In this way, the tip is scanned while preventing interference with the protrusion area. At this time, the control unit may halt the scanning and move the tip in the Z-direction. Then, the scanning may be resumed. Consequently, contact with the protrusion area can be avoided with greater certainty.

When the tip arrives at the next observation position as a result of this scanning, the control unit stops the scanning and moves the tip in the Z-direction toward the sample surface. The observation unit again performs an observation step to thereby collect next observational data.

As described above, during the scanning step, whenever a variation in the state of vibration of the tip is detected by the detection unit, the control unit moves the tip in the Z-direction away from the sample surface, and the scanning is performed again. That is, the tip is scanned in such a way that the tip is pulled up a small distance whenever a variation in the state of vibration is detected. In this way, even if a protrusion area is present on the sample surface in the scanning path of the probe tip, the scanning can be performed with the shortest path along the profile of the protrusion area as faithfully as possible while avoiding the protrusion area. Therefore, the scanning time can be shortened. That is, the measuring time can be shortened. The throughput can be improved.

During the observation step, the probe tip is brought close to a position where the state of vibration varies, i.e., the position is in proximity or contact with the sample surface. Therefore, even if the sample surface is greatly uneven, it is assured that the tip can be brought close to the position where observational data is collected. Accordingly, observational data such as precise topographic data can be collected irrespective of the size of the unevenness of the sample surface. Therefore, the measuring accuracy can be improved. Especially, the interaction between the probe tip and sample is small at each observation position and uniform among individual observation positions. Therefore, even if the vibration amplitude of the tip is quite small, it can precisely trace large topography. That is, large topography can be measured accurately even with quite small amplitudes.

Furthermore, during this observation step, the amplitude of the probe tip can be set small (e.g., below 20 nm) as described previously. Therefore, dissipation energy that is produced by the force exerted between the probe tip and sample is reduced. Consequently, damage due to collision between the tip and sample can be reduced or avoided. In addition, even where the topography is large, lateral force acting on the probe tip from a steep incline can be reduced. As a result, the topography of the steep incline can be measured more precisely.

A further scanning probe microscope according to the invention is based on the scanning probe microscope of the invention already described and further characterized in that the detection unit detects a variation in the state of vibration of the probe tip when the state of vibration of the tip varies beyond a predetermined threshold value during the scanning. In response to the detection, the control unit moves the tip in the Z-direction until the threshold value is no longer exceeded.

In the scanning probe microscope according to the invention, during the scanning step, if the probe tip is in proximity or contact with a protrusion area on a sample, a force such as Van der Waals force exerted between the probe tip and sample varies the state of vibration of the tip (e.g., the vibration amplitude attenuates). Then, the detection unit compares the variation in the state of vibration of the tip with a predetermined threshold value. When the threshold value is exceeded, it is judged that the tip is in proximity or contact with the sample surface. In response to this, the control unit pulls up the tip until the threshold value is no longer exceeded, i.e., the tip is neither in proximity nor in contact with the sample surface.

In particular, the control unit pulls up the probe tip by feedback control only when the state of vibration of the tip exceeds the threshold value. Therefore, it is not necessary to perform a continuous feedback operation. Hence, continuous hunting oscillation can be reduced.

A further scanning probe microscope according to the invention is based on the scanning probe microscope of the invention already described and further characterized in that the control unit scans the probe tip after observational data is collected and the tip is moved in the Z-direction away from the sample surface.

Another scanning method according to the invention is based on the scanning method of the invention described already and further characterized in that a separating step for moving the probe tip in the Z-direction away from the sample surface is performed after the observation step.

In the scanning probe microscope and scanning method according to the present invention, the control unit scans the probe tip after the tip that is in proximity or contact with the sample surface during the observation step is once moved away from the sample surface. That is, the control unit increases the distance between the probe tip and sample surface by this separating step. Then, the scanning step is performed. This secures a distance between the tip and sample surface. Hence, the possibility of damage due to collision between the tip and sample surface can be reduced further. Consequently, the safety can be improved.

A further scanning probe microscope according to the invention is based on any one of the above-described scanning probe microscopes of the invention and further characterized in that the variation in the state of vibration is at least one of the degree of attenuation of the vibration amplitude of the probe tip, the degree of variation of the phase of the vibration of the tip, and the degree of variation of the frequency of the vibration of the tip.

In another feature of the scanning probe microscope according to the invention, the detection unit can easily detect proximity or contact with the sample surface by noting at least one of the degree of attenuation of the amplitude of the vibration of the probe tip, the degree of variation in the phase of the vibration of the tip, and degree of variation in the frequency of the vibration of the tip.

A still other scanning probe microscope according to the invention is based on any one of the scanning probe microscopes of the invention already described and further characterized in that when the tip has reached a next observation position in the X- or Y-direction during the scanning, the control unit stops scanning of the probe tip and once moves the tip a given distance in the Z-direction away from the sample surface. Then, the control unit brings the tip into proximity or contact with the sample surface and collects the observational data.

A yet other scanning method according to the invention is based on the scanning method of the invention already described and further characterized in that the scanning of the probe tip is stopped during the observation step. Then, the tip is once moved a given distance in the Z-direction away from the sample surface. Then, the tip is moved in the Z-direction toward the sample surface.

In this scanning probe microscope and scanning method according to the invention, during the observation step, the probe tip is once pulled up a given distance from the height assumed during the scanning and then brought into proximity or contact with the sample surface. Then, the observational data is collected. Therefore, even if the tip is captured in the adhesive water layer by the topography of the sample at the end of the scanning, the tip can be reliably placed into a position where the tip is disengaged from the adhesive water layer prior to measurement. Then, the tip is moved from the position, where the tip is not affected by the adhesive water layer, in the Z-direction toward the sample and the observational data is collected. That is, the probe tip that is not captured in the adhesive water layer (i.e., in a state where the vibration is not attenuated by the effects of the adhesive water layer) is moved toward the sample. Therefore, the observational data can be collected more precisely. Accordingly, the reliability of the measurement can be improved.

A still additional scanning probe microscope according to the invention is based on the scanning probe microscope of the invention already described and further characterized in that the vibration unit sets the amplitude of the vibration of the probe tip when the tip is brought into proximity or contact with the sample surface and the observational data is collected smaller than the amplitude of the vibration of the tip assumed during the scanning.

A still further scanning method according to the invention is based on the scanning method of the invention described previously and further characterized in that during the observation step, the probe tip is once moved a given distance in the Z-direction away from the sample surface after a variation in the state of vibration of the tip is detected. A vibration amplitude variation step in which the amplitude of the vibration of the tip is made smaller than during the scanning step is performed. After the vibration amplitude variation step, the tip is moved in the Z-direction toward the sample surface.

In this scanning probe microscope and scanning method according to the invention, during the observation step, the amplitude of the vibration of the probe tip is reduced by the vibration amplitude variation step and measurements are performed. That is, during the scanning step, scanning can be performed with vibration amplitudes greater than during the observation step. Accordingly, the servo system responds quickly. During the time interval between the instant when a variation in the state of vibration of the tip is detected and the instant when the tip is pulled up, collision between the tip and sample surface can be prevented; otherwise, they would be damaged.

A still additional scanning probe microscope according to the invention is based on the scanning probe microscope of the invention described previously and further characterized in that the given distance has been determined based on at least one condition of the kind of the probe tip, the kind of the sample, the temperature of the measuring environment around the sample surface and the probe tip at the time of measurement, and the humidity of the measuring environment.

In the scanning probe microscope according to the invention, the probe tip is once pulled up the given distance determined based on at least one of the kind of the probe tip, the kind of the sample, the temperature of the measuring environment, and the humidity of the measuring environment. Therefore, even if the thickness of the adhesive water layer on the sample surface is varied by the aforementioned condition, it is assured that the probe tip can be pulled up to a position where the tip is not affected by the adhesive water layer prior to measurements. Hence, the reliability of the observational data can be improved further.

An additional scanning probe microscope according to the invention is based on the scanning probe microscope of the invention described already and further characterized in that the given distance is more than 1 nm.

In the scanning probe microscope according to the invention, in a case where the temperature or humidity of the measuring environment is low, it is assured that the probe tip can be pulled up to a position where the tip is not affected by the adhesive water layer. Furthermore, any extra time to pull up the tip is not necessary. Consequently, the measuring time can be shortened.

An additional scanning probe microscope according to the invention is based on the scanning electron microscope of the invention described previously and further characterized in that the given distance is more than 10 nm.

In the scanning probe microscope according to the invention, it is assured that the probe tip can be pulled up to a position where the tip is not affected by the adhesive water layer even in an extreme state in which the humidity is 99%.

An additional scanning probe microscope according to the invention is based on any one of the scanning probe microscopes of the invention described previously and further characterized in that the observation unit collects different kinds of observational data at the same time.

An additional scanning probe microscope according to the invention is based on the scanning probe microscope of the invention described previously and further characterized in that the observational data consists of two kinds of data.

An additional scanning probe microscope according to the invention is based on the scanning probe microscope of the invention described previously and further characterized in that the observational data consists of three or more kinds of data.

In the scanning probe microscope according to the invention, the observation unit collects different kinds of observational data at the same time when the probe tip is in proximity or contact with the sample surface. Therefore, desired various kinds of observational data can be collected efficiently.

An additional scanning probe microscope according to the invention is based on any one of the above-described scanning probe microscopes of the invention and further characterized in that in the observation position, the observation unit places the probe tip in a position spaced a given distance from the sample surface in the Z-direction. The observation unit again collects observational data in this position.

An additional scanning method according to the invention is based on any one of the above-described scanning methods of the invention and further characterized in that during the observation step, observational data is again collected when the probe tip is in a position spaced a given distance from the sample surface in the Z-direction.

In the scanning probe microscope and scanning method according to the invention, during the observation step, the observation unit again collects observational data when the probe tip is in a position spaced a given distance from the sample surface in the Z-direction. That is, the observation unit can collect observational data at the above-described position, in addition to observational data produced when the tip and sample surface are in proximity or contact with each other. At this time, the observation unit can obtain a three-dimensional distribution of information about a physical property of the sample surface (e.g., image of three-dimensional magnetic charge distribution) while the effects of the topography are reduced. More versatile collection of observational data can be performed.

An additional scanning probe microscope according to the invention is based on the above-described scanning probe microscope of the invention and further characterized in that when the observation unit again collects observational data, the collected data and the observational data obtained when the probe tip is in proximity or contact with the sample surface are identical or different in kind.

In this scanning probe microscope according to the invention, when the probe tip is in proximity or contact with the sample surface, a first kind of observational data is collected. When the tip is spaced a given distance in the Z-direction from the sample surface, a second kind of observation data is collected. The first and second kinds may be identical or different. Therefore, more effective observational data can be collected.

According to the scanning probe microscope and scanning method of the present invention, during the scanning step, the control unit pulls up the probe tip a small distance whenever a variation in the state of vibration of the tip is detected by the detection unit. In this way, scanning is performed. Therefore, even if a protrusion area is present on the sample surface in the scanning path of the probe tip, the scanning can be performed with the shortest path along the contour of the protrusion as faithfully as possible while avoiding the protrusion area. Consequently, the scanning time can be shortened. That is, the measuring time can be shortened. The throughput can be improved.

During the observation step, the probe tip is brought close to a position where the state of vibration varies, i.e., the tip is brought into proximity or contact with the sample surface. Therefore, even if the topography of the sample is large, it is assured that the tip can be brought close to the position where the observational data is collected. Accordingly, observational data such as precise topographic data can be collected irrespective of the size of the unevenness of the sample surface. The measuring accuracy can be improved. Especially, the interaction between the probe tip and sample is small at each observation position and uniform among individual observation positions. Therefore, even if the vibration amplitude of the tip is quite small, it can precisely trace large topography. That is, large topography can be measured accurately even with quite small amplitudes.

Furthermore, during this observation step, the amplitude of the probe tip can be set small (e.g., less than 20 nm) as described previously. Therefore, dissipation energy produced by exertion of force between the probe tip and sample can be reduced. Consequently, damage due to collision between the tip and sample can be reduced or avoided. In addition, even where the topography is large, lateral force acting on the probe tip from a steep incline can be reduced. As a result, the topography of the steep incline can be measured more precisely.

DETAILED DESCRIPTION OF THE INVENTION

Figure 1:
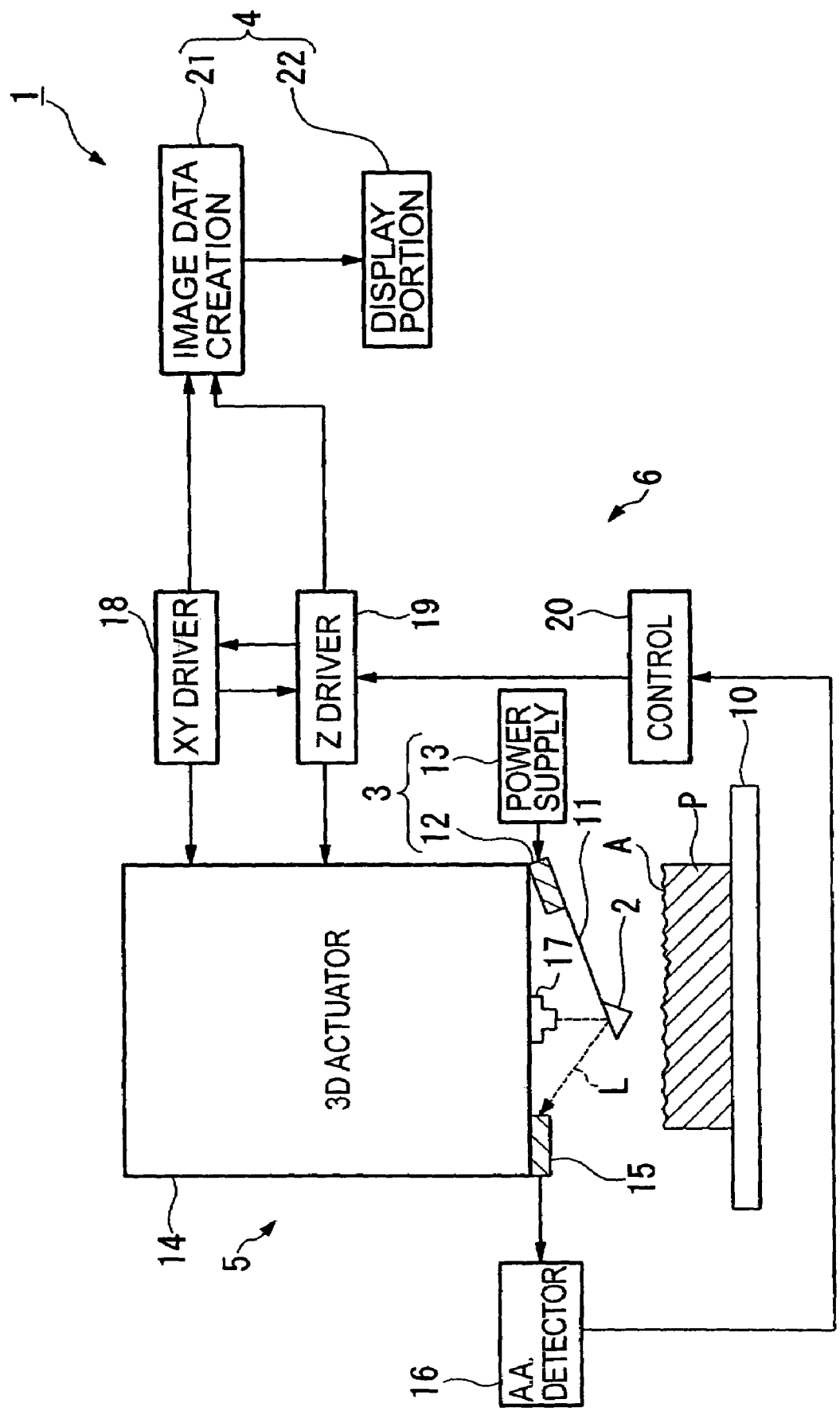
FIG. 1 is a block diagram of a scanning probe microscope according to a first embodiment of the present invention.

A first embodiment of the scanning probe microscope according to the present invention is hereinafter described with reference to FIGS. 1 to 5.

The scanning probe microscope according to the present invention is generally indicated by reference numeral 1 in FIG. 1 and has a probe tip 2 capable of scanning in X- and Y-directions parallel to a surface (hereinafter referred to as the sample surface A) of a sample P and of moving in the Z-direction vertical to the sample surface A, all relative to the sample surface A, a vibration unit 3 for vibrating the tip 2 at a vibration frequency that resonates with or forcedly vibrates the tip, an observation unit 4 for collecting observational data when the tip 2 is in proximity or contact with the sample surface A, a detection unit 5 for detecting variations in the state of vibration of the tip 2 when the tip 2 is in proximity or contact with the sample surface A, and a control unit 6 for controlling the scans of the tip 2 in the X- and Y-directions and movement of the tip 2 in the Z-direction.

The sample P is placed on the top surface of a sample stage 10. A cantilever 11 having the probe tip 2 at its one end is mounted above the sample P, the tip 2 being located opposite to the sample P. A vibration element 12 is fixed at the other end of the cantilever 11. The vibration element 12 has a function of resonating or forcedly vibrating the cantilever 11 with a vibration voltage supplied from a vibration voltage power supply 13. That is, the vibration element 12 and the vibration voltage power supply 13 together form the above-described vibration unit 3. The vibration frequency of the vibration element 12 is 100 kHz, for example. The vibration element 12 vibrates the probe tip 2 at this vibration frequency.

One end of the cantilever 11 on the side of the vibration element 12 is fixedly mounted to a three-dimensional (3D) actuator 14, which can move in X- and Y-directions parallel to the sample surface A and in Z-direction that is vertical to the sample surface A. In this way, the probe tip 2 can move in the above-described directions relative to the sample surface A via the 3D actuator 14 and cantilever 11.

A cantilever displacement detector 15 connected with an amplitude attenuation detector portion 16 and a laser generator 17 for emitting laser light L to the rear surface of the cantilever 11 are disposed in the 3D actuator 14. The detector 15 can consist, for example, of a photodetector, and has functions of receiving the laser light L reflected off the rear surface of the cantilever 11, measuring the incident position of the laser light L, and detecting the amount of displacement of the cantilever 11. In particular, the direction of reflection of the laser light L directed at the rear surface of the cantilever 11 from the laser generator 17 varies according to the state of vibration of the cantilever 11 and so the incident position of the laser light L on the cantilever displacement detector 15 varies. The displacement detector 15 outputs the amount of displacement of the cantilever 11 as a vibration waveform corresponding to the incident position to the amplitude attenuation detector portion 16.

The amplitude attenuation detector portion 16 has a function of calculating the amount of displacement of the cantilever 11, the amount being sent from the cantilever displacement detector 15. That is, the detector portion 16 has a function of calculating the vibration amplitude of the probe tip 2 and the degree of attenuation of the vibration amplitude according to the waveform of the vibration. At this time, when the variation in the vibration amplitude of the probe tip 2 exceeds a preset threshold value, the detector portion 16 informs the control portion 20 of this fact. The actual amount of attenuation or attenuation rate may be used as the degree of attenuation of the amplitude of the vibration. That is, the cantilever displacement detector 15, amplitude attenuation detector portion 16, and laser generator 17 together form the detection unit 5 described above.

An XY driver portion 18 and a Z driver portion 19 for driving the 3D actuator 14 to scan the probe tip in the X- and Y-directions and in the Z-direction are connected with the 3D actuator 14. The XY driver portion 18 and Z driver portion 19 are under overall control of the control portion 20 connected with the amplitude attenuation detector portion 16. The control portion 20 also controls the Z driver portion 19 according to the degree of attenuation of the amplitude of the vibration of the probe tip 2 detected by the amplitude attenuation detector portion 16. That is, the 3D actuator 14, XY driver portion 18, Z driver portion 19, and control portion 20 together constitute the control unit 6.

The XY driver portion 18 and Z driver portion 19 are connected with an image data generation portion 21. The image data generation portion 21 detects the position of the probe tip 2 according to driving data about the XY driver portion 18 and Z driver portion 19 and collects the positional data as observational data. The observational data is displayed on the display portion 22 of a monitor device or the like. That is, the image data generation portion 21 and display portion 22 together form the observation unit 4.

The control portion 20 is preset to control the XY driver portion 18 and Z driver portion 19 and to collect the observational data. Then, the control portion 20 moves the probe tip 2 in the Z-direction away from the sample surface A, and scans the tip 2 in a direction parallel to the sample surface A until a next observational position in the X- or Y-direction is reached. When a variation in the state of vibration of the tip 2 is detected during the scanning, the scanning is once stopped. The tip 2 is moved in the Z-direction away from the sample surface A. Then, the scanning is resumed.

That is, when the control portion 20 is informed from the amplitude attenuation detector portion 16 that the variation in the amplitude of the vibration of the probe tip 2 has exceeded the predetermined threshold value for the tip 2, the tip 2 is pulled up until a state in which the variation of the vibration amplitude does not exceed the threshold value. The operation of the control portion 20 will be described in detail later.

A case where the probe tip 2 is scanned across the sample surface A by the scanning probe microscope 1 constructed as described above, observational data about the sample P is collected, and a topographic image of the sample P is created is described below.

First, vibration voltage is supplied to the vibration element 12 from the vibration voltage power supply 13 shown in FIG. 1 to vibrate the probe tip 2 at the vibration frequency. Under this condition, the control portion 20 operates the XY driver portion 18 to scan the 3D actuator 14 in the X- and Y-directions. That is, the tip 2 is scanned over the sample P as indicated by an XY trajectory XY1 shown in FIG. 2 while vibrating the tip 2. During the scanning step, the tip 2 is vibrating at a small vibration amplitude B of 20 nm or less as indicated by vibration waveform W1 shown in FIG. 3.

Figure 2:
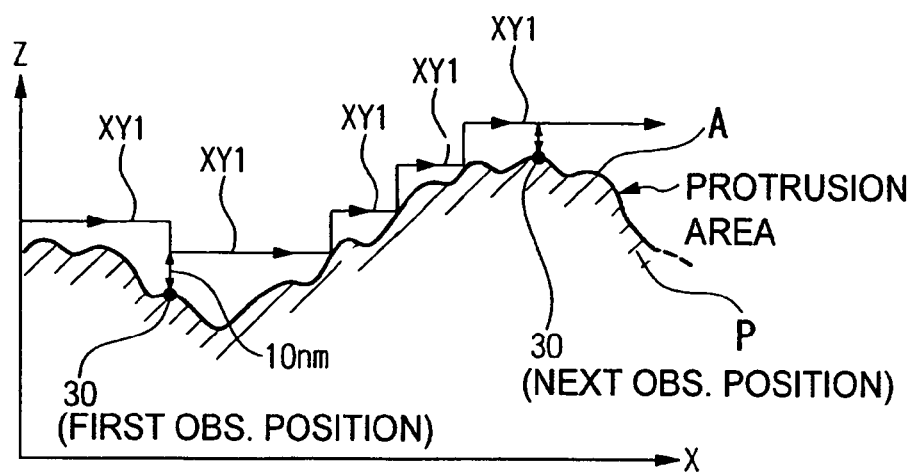
FIG. 2 is a diagram showing the scanning trajectory of a probe tip, illustrating a scanning method of the invention.
Figure 3:
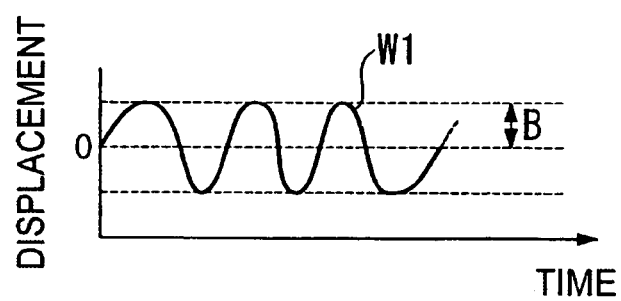
FIG. 3 is a vibration waveform diagram illustrating the degree of attenuation of the amplitude of vibration of the probe tip of the scanning probe microscope shown in FIG. 1, showing the vibration waveform during a scanning step.
Figure 4:
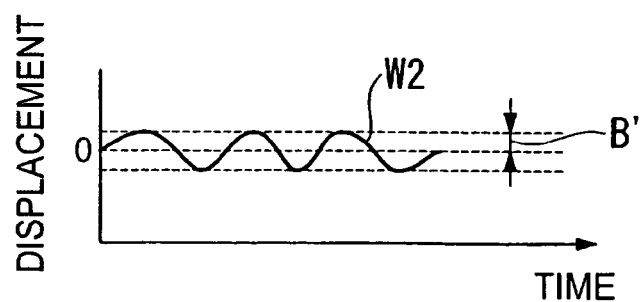
FIG. 4 is a vibration waveform diagram illustrating the degree of attenuation of the amplitude of vibration of the probe tip of the scanning probe microscope shown in FIG. 1, showing the vibration waveform when a force such as Van der Waals force acts between the probe tip and the sample.
Figure 5:
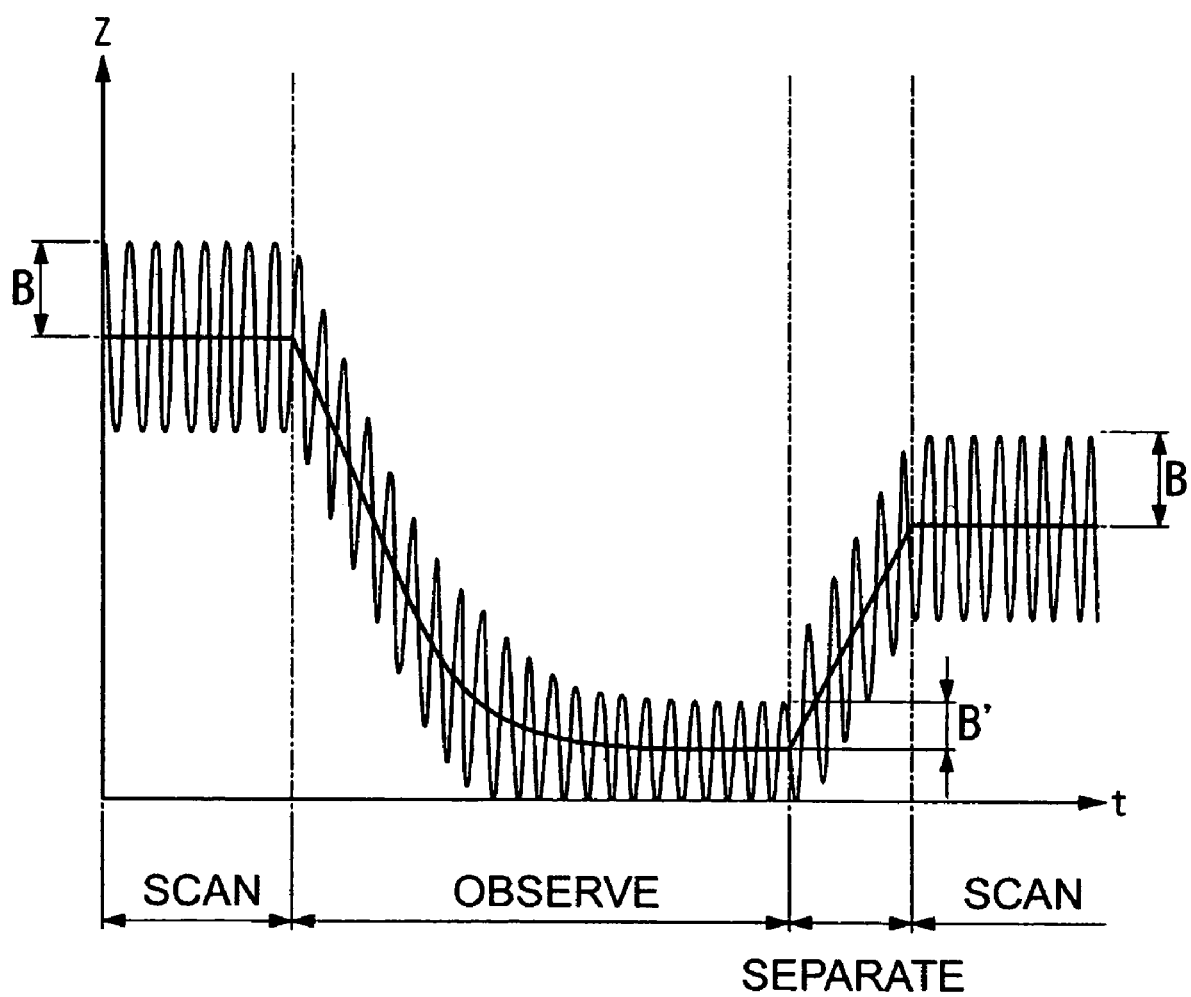
FIG. 5 is a diagram showing the relation between the vibration amplitude of the probe tip of the scanning probe microscope shown in FIG. 1 and the height from the sample surface during a sequence including a scanning step, an observation step, a separating step, and a second scanning step.

During the scanning step, when the probe tip 2 reaches a position over a preset observation position 30, the control portion 20 once stops the operation of the XY driver portion 18. As shown in FIGS. 2 and 5, the control portion 20 controls the Z driver portion 19 to move the 3D actuator 14 downward. That is, the tip 2 is moved in the Z-direction toward the sample surface A.

If the probe tip 2 comes in proximity or contact with the sample surface A by the downward movement, a force (such as Van der Waals force or repulsive force due to contact) acts between the tip 2 and sample P. Then, the vibration amplitude B of the tip 2 attenuates to vibration amplitude W2 shown in FIG. 4 and to vibration amplitude B' shown in FIG. 5. The vibration attenuation detector portion 16 calculates the vibration amplitude of the tip 2 from the amount of displacement of the cantilever 11, the amount being sent in from the cantilever displacement detector 15. When the variation in the vibration amplitude exceeds a preset threshold value, the detector portion judges that the state of the vibration of the tip 2 has varied (i.e., the degree of attenuation of the vibration has varied) and informs the control portion 20 of this fact.

The control portion 20 informed from the amplitude attenuation detector portion 16 that the degree of attenuation of the probe tip 2 has varied controls the Z driver portion 19 and stops movement of the 3D actuator 14 in the Z-direction. Consequently, the approaching motion between the tip 2 and sample P stops before a large load is applied to the sample P. Hence, the tip 2 and sample P are prevented from being excessively loaded. When movement of the tip 2 has stopped, the image data generation portion 21 collects observational data at the observation position 30, i.e., positional data in the Z-direction.

After the end of the observation step, the control portion 20 controls the Z driver portion 19 and moves the probe tip 2 in the Z-direction away from the sample P over a distance of 10 nm, for example, as shown in FIG. 5. This pull-up motion of 10 nm assures that the tip 2 can be pulled up from the adhesive water layer even if the tip 2 is captured in the adhesive water layer present on the surface of the sample P during the observation step.

In the above-described separating step, the probe tip 2 is pulled up a distance of 10 nm. This distance is not restricted to 10 nm.

After the separating step, the control portion 20 stops the Z driver portion 19 and controls the XY driver portion 18 to scan the sample P again with the tip 2 as indicated by the XY trajectory XY1 shown in FIG. 2. Because of the separating step, the vibration amplitude of the tip 2 has been returned to the vibration waveform W1 of FIG. 3 and the original vibration amplitude B shown in FIG. 5. At this time, as described previously, the tip 2 has been disengaged from the adhesive water layer by the separating step and so the scanning can be performed without being affected by the adhesive water layer. Therefore, the vibration amplitude B of the tip 2 during the scanning step can be set to a small vibration amplitude of 20 nm or less as described previously.

During this scanning step, in a case where the probe tip 2 approaches a protrusion area on the sample surface A as shown in FIG. 2, a force (such as Van der Waals force) acts between the sample P and tip 2 in the same way as in the aforementioned observation step. The amplitude attenuation detector portion 16 compares the degree of attenuation of the vibration amplitude of the tip 2 with the threshold value and thus detects the degree. The detector portion 16 informs the control portion 20 of this degree of attenuation. In response to the degree of attenuation, the control portion 20 stops the XY driver portion 18 and once stops the scanning. The control portion 20 operates the Z driver portion 19 to move the tip 2 in the Z direction away from the sample surface A until it assumes a state where the threshold value for the attenuation detector portion 16 is not exceeded. After the movement in the Z direction, the control portion 20 stops the Z driver portion 19 and drives the XY driver portion 18 to scan the tip 2 again.

In this way, where the sample P has a protrusion area in the scanning path during the scanning step, the control portion 20 controls the XY driver portion 18 and Z driver portion 19 to scan the tip 2 up to the next observation position 30 while repeatedly performing the sequence of operations including halt of the scanning, pulling up, and resumption of the scanning. Furthermore, the tip 2 is pulled up also when it has approached a protrusion area. Therefore, it is not necessary to take account of the effects of an adhesive water layer. The small vibration amplitude B suffices.

When the probe tip 2 reaches the next observation position 30 as shown in FIG. 2, the above-described observation step is carried out. The image data generation portion 21 collects positional data in the Z-direction at the observation position. That is, the aforementioned scanning step, observation step, and separating step are repeated in turn to collect positional data at every observation position 30. By collecting the positional data in this manner, a topographic image of the surface of the sample P can be obtained. Furthermore, the collected positional data can be displayed on the display portion 22.

According to the above-described scanning probe microscope 1 and scanning method, during the scanning step, the control portion 20 performs scanning while pulling up the probe tip 2 until a state where the variation in the state of vibration does not exceed the preset threshold value whenever the variation in the state of vibration of the tip 2 is detected by the amplitude attenuation detector portion 16. Consequently, even if the sample surface A has a protrusion area in the scanning path of the probe tip 2, the scanning can be performed with the shortest path along the contour of the protrusion area as faithfully as possible while avoiding the protrusion area. Accordingly, the scanning time can be shortened, i.e., the measuring time, can be shortened. The throughput can be improved.

When the probe tip 2 is in proximity to a protrusion area on the sample surface A, the control portion 20 pulls up the tip 2. Therefore, even if the tip 2 is captured in the adhesive water layer on the sample surface A, the tip 2 can be disengaged from the adhesive water layer by the pull-up operation. In consequence, it is not necessary to take account of the effects of the adhesive water layer. The amplitude of the tip 2 can be reduced to a minimum.

During the observation step, the probe tip 2 is brought close to a position where the state of vibration varies, i.e., the tip 2 is brought into proximity or contact with the sample surface A. Therefore, even if the unevenness of the surface of the sample P is large, it is assured that the tip 2 can be brought close to the position where the positional data is collected. Therefore, precise observational data such as topographic data can be collected irrespective of the size of unevenness of the surface of the sample P. The measuring accuracy can be improved. Especially, the interaction between the probe tip 2 and sample P is small at each observation position 30 and uniform among the observation positions. Therefore, even if the amplitude of the vibration of the tip 2 is quite small, large topography can be traced precisely. That is, large topography can be measured accurately even with quite small amplitudes.

Furthermore, during this observation step, the amplitude of the probe tip 2 can be set small as described above. Therefore, dissipation energy caused by exertion of force between the tip 2 and sample P can be reduced. Damage due to collision between the tip 2 and sample P can be reduced or avoided. In addition, even where the topography is large, lateral force acting on the tip 2 and cantilever 11 from a steep incline can be reduced. Consequently, the topography of a steep incline can be measured precisely.

During the scanning step, the control portion 20 pulls up the probe tip 2 by feedback control as mentioned previously only when the state of vibration of the tip 2 has exceeded the threshold value. Therefore, it is not necessary to provide a continuous feedback control. Hence, continuous hunting oscillations can be reduced.

Furthermore, since the control portion 20 performs a scanning step after separating the probe tip 2 and sample surface A by the separating step, the scanning can be performed while securing the distance between the tip 2 and sample surface A with certainty. Accordingly, possibility of damage due to collision between the tip 2 and sample surface A can be reduced further. The safety can be improved.

A second embodiment of the present invention is next described with reference to FIG. 6. In this and first embodiments, like components are denoted by like reference numerals and their description is omitted.

The difference between the second and first embodiments is as follows. In the first embodiment, during the observation step, immediately after the control unit 6 stops the scanning of the probe tip 2, the control unit 6 moves the tip toward the sample P. In contrast, in the scanning probe microscope according to the second embodiment, after the control unit 6 once pulls up the probe tip 2, the control unit 6 moves the tip toward the sample P.

In particular, the scanning probe microscope of the present embodiment is preset such that during the observation step, the control portion 20 controls the Z driver portion 19 to once move the probe tip 2 in the Z direction away from the sample surface A over a given distance, e.g., 10 nm. Then, the tip 2 is moved toward the sample surface A.

Figure 6:
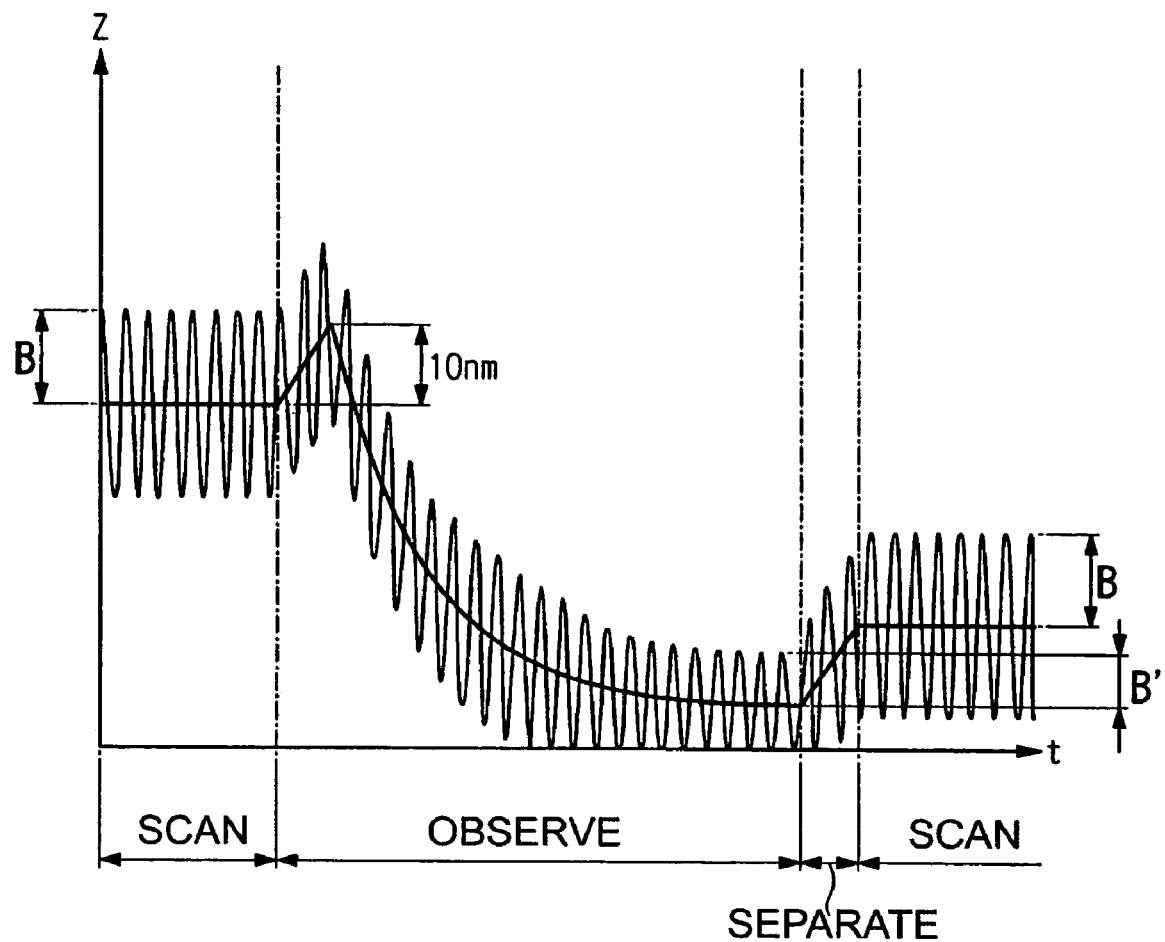
FIG. 6 is a diagram showing the relation between the vibration amplitude of the probe tip of a scanning probe microscope according to a second embodiment of the invention and the height from the sample surface during a sequence including a scanning step, an observation step, a separating step, and a second scanning step.

With the scanning probe microscope constructed in this way, when the probe tip 2 is scanned and moved into the observation position 30 by the scanning step, the control portion 20 stops the XY driver portion 18 and drives the Z driver portion 19 to pull up the tip 2 once over a distance of 10 nm from the height assumed during the scanning as shown in FIG. 6.

In this way, when the probe tip 2 has reached the observation position 30, even if the tip 2 is captured in the adhesive water layer due to the shape of a protrusion area on the sample P, the tip 2 can be reliably disengaged from the water layer prior to measurements because the tip is pulled up a distance of 10 nm from that position. The tip 2 in the position where the tip 2 is not affected by the adhesive water layer is moved toward the sample P and positional data is collected. That is, the tip 2 that is not captured in the adhesive water layer (i.e., not undergoing attenuation of the vibration due to the effects of the adhesive water layer) is moved toward the sample P. Therefore, collection of the observational data can be performed more precisely. Accordingly, the reliability of the measurement can be improved.

A third embodiment of the present invention is next described with reference to FIGS. 7 and 8. In this and first embodiments, like components are indicated by like reference numerals and so their description is omitted.

The difference between the third and first embodiments is as follows. In the first embodiment, the vibration unit 3 always vibrates the cantilever 11 at the vibration amplitude B. During the observation step, the control unit 6 stops the scanning of the probe tip 2 and immediately moves the tip 2 toward the sample P. In contrast, in the scanning probe microscope according to the third embodiment, when the tip 2 is brought into proximity or contact with the sample surface A and observational data is collected, the vibration unit 3 sets the vibration amplitude smaller than the vibration amplitude of the tip 2 used during the scanning step. Furthermore, during the observation step, if a variation in the state of vibration of the tip 2 is detected by the amplitude attenuation detector portion 16, the control unit 6 once pulls up the tip 2 and then moves it toward the sample P.

Figure 7:
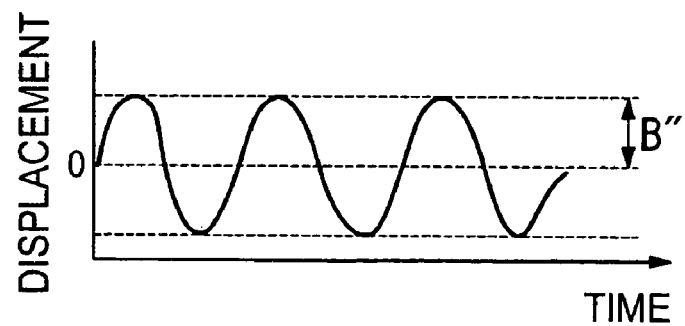
FIG. 7 is a vibration waveform diagram illustrating the degree of attenuation of the amplitude of vibration of the probe tip of a scanning probe microscope according to a third embodiment of the invention, showing the vibration waveform during a scanning step.
Figure 8:
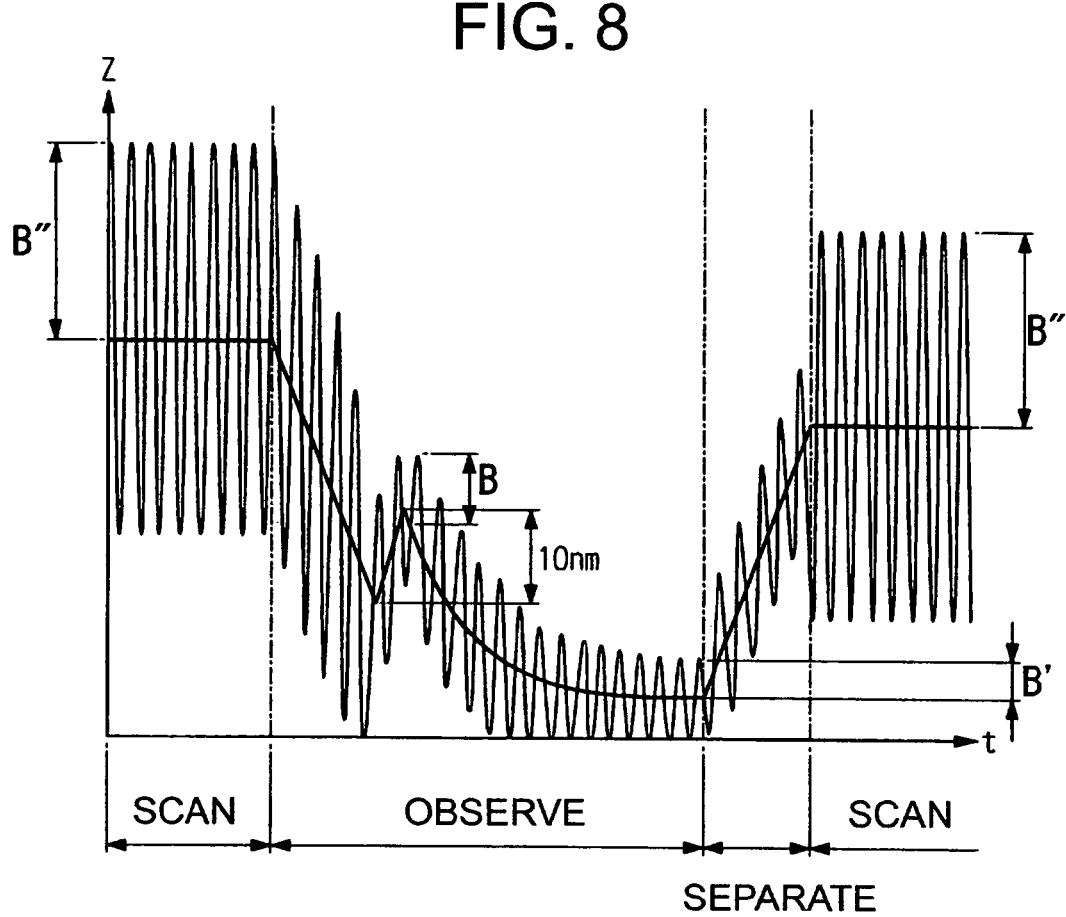
FIG. 8 is a diagram showing the relation between the vibration amplitude of the probe tip of the scanning probe microscope according to the third embodiment of the invention and the height from the sample surface during a sequence including a scanning step, an observation step, a separating step, and a second scanning step.

Specifically, in the scanning probe microscope of the present embodiment, during the scanning step, the vibration element 12 vibrates the cantilever 11 at a large vibration amplitude B" of 100 nm, for example, as indicated by vibration waveform W3 shown in FIG. 7, with the vibration voltage supplied from the vibration voltage power supply 13. When a signal indicating a variation in the amplitude is received from the control portion 20, the vibration element 12 vibrates the cantilever 11 at the same vibration amplitude B' as in the first embodiment. In this way, the vibration unit 3 can vary the vibration amplitude of the cantilever 11.

The control portion 20 is preset to control the Z driver portion 19 and to move the probe tip 2 in the Z-direction toward the sample surface A during the observation step. Because of this movement, the tip 2 is brought into proximity or contact with the sample surface A. If a variation in the state of the vibration is detected by the amplitude attenuation detector portion 16, the tip 2 is once moved in the Z-direction away from the sample surface A over a given distance of 10 nm, for example. Then, the tip 2 is again moved toward the sample surface A. When the tip 2 is pulled up, the control portion 20 sends a signal for varying the vibration amplitude B" of the tip 2 to the vibration amplitude B to the vibration voltage power supply 13. Furthermore, after the separating step in which the positional data is collected and the probe tip 2 is pulled up, the control portion 20 sends a signal for varying the vibration amplitude B of the tip 2 to the vibration amplitude B" assumed during the scanning step to the vibration voltage power supply 13.

In the scanning probe microscope constructed in this way, the vibration element 12 first vibrates the cantilever 11 at vibration amplitude B" as shown in FIG. 7 with the vibration voltage supplied from the vibration voltage power supply 13. Thus, the probe tip 2 is scanned while vibrating at the vibration amplitude B" as shown in FIG. 8. Because of this scanning step, when the tip 2 reaches the observation position 30, the control portion 20 stops the XY driver portion 18 and drives the Z driver portion 19 to move the tip 2 in the Z-direction toward the sample surface A while the tip 2 is vibrating at the vibration amplitude B". When the tip 2 is brought into proximity or contact with the sample surface A because of this movement, the vibration amplitude B" varies. Therefore, the amplitude attenuation detector portion 16 detects a variation in the state of vibration of the tip 2 and informs the control portion 20 of this fact.

When receiving the information from the amplitude attenuation detector portion 16, the control portion 20 controls the Z driver portion 19 to once pull up the tip 2 a distance of 10 nm. This operation for pulling up the tip 2 minimizes damage due to collision between the tip 2 and sample P. During the collision, even if the tip 2 is captured in the adhesive water layer on the sample surface A, it is assured that the tip 2 can be disengaged from the adhesive water layer.

Simultaneously with the operation for pulling up the tip, the control portion 20 sends a signal for varying the amplitude to the vibration voltage power supply 13. When receiving the signal for varying the amplitude from the control portion 20, the vibration voltage power supply 13 varies the vibration amplitude of the cantilever 11, i.e., of the probe tip 2, to the vibration amplitude B as shown in FIG. 8 via the vibration element 12. Furthermore, the control portion 20 controls the Z driver portion 19. Simultaneously with this step for varying the vibration amplitude, the control portion 20 pulls up the tip 2 over a distance of 10 nm. Then, the control portion moves the tip toward the sample surface A again. The tip 2 comes to a stop in a position where a variation in the state of the vibration due to the aforementioned force (such as Van der Waals force or repulsive force caused by contact) was detected. In this position, the image data generation portion 21 collects positional data. After this observation step, the control portion 20 controls the Z driver portion 19 and performs the separating step for pulling up the tip 2. After the separating step, the control portion 20 controls the XY driver portion 18 to scan the tip 2 again. At this time, the control portion 20 sends a signal for varying the amplitude to the vibration voltage power supply 13 to vary the vibration amplitude of the tip 2 to the vibration amplitude B" again.

As described above, during the scanning step, the vibration amplitude is B" that is greater than during the observation step. Accordingly, the servo system responds quickly. During the time interval between the instant when a variation in the state of vibration of the probe tip 2 is detected and the instant when the tip 2 is pulled up, collision between the tip 2 and sample surface A can be prevented. Therefore, during the scanning step, damage due to collision between the tip 2 and sample P can be reduced or avoided.

It is to be noted that the technical scope of the present invention is not limited to the above-described embodiments. Various changes and modifications can be made without departing from the spirit and scope of the invention.

For example, in the above embodiments, the detection unit detects a variation in the state of vibration according to the degree of attenuation of the amplitude of vibration of the probe tip. The method of detection is not limited to this. For instance, a variation in the state of vibration may be detected by noting the degree of variation of the phase or frequency of the vibration of the tip. Also, in these cases, when the phase or frequency of the vibration varies to a certain threshold value, it is judged that the state of vibration has varied.

The control unit pulls up the probe tip a given distance of 10 nm during the scanning step and during the separating step. The given distance is not limited to 10 nm. The given distance may be varied according to the kind of the tip, the kind of the sample, the temperature of the measuring environment around the sample surface and the tip during measurement, or the humidity of the measuring environment. That is, the state of the adhesive water layer on the surface of the sample varies according to these conditions. The given distance over which the tip is pulled up may be varied appropriately to prevent the adhesive water layer from being affected by these variations. For example, depending on the temperature and humidity, the given distance may be set to 1 nm. Furthermore, where the given distance is set to greater than 10 nm, even if the humidity is in an extreme case (e.g., 99%), it is assured that the tip can be pulled up to a position where the tip is no longer affected by the adhesive water layer.

Furthermore, in the above embodiments, when the probe tip is pulled up during the scanning step, the control unit once stops the scanning, pulls up the tip, and then resumes the scanning. The scanning may not be once stopped. However, by once stopping the scanning, protrusion areas on the sample can be avoided with greater certainty.

In addition, in the above embodiments, the observation unit collects positional data as observational data. The kind of the observational data is not limited to this. That is, a constant regarding the elasticity or viscosity of the sample, electrical resistance, adhesive force, or other information about the surface characteristics may be measured. Moreover, different kinds of observational data may be collected simultaneously when the tip is in proximity or contact with the sample surface rather than only one kind of those observational data is collected. In this way, desired various observational data can be collected efficiently.

Further, in the above embodiments, observational data is collected while the probe tip is in proximity or contact with the sample surface. Additionally, the control unit may place the tip in a position spaced a given distance of h from the sample surface in the Z-direction, and observational data may be again collected in this position.

Figure 9:
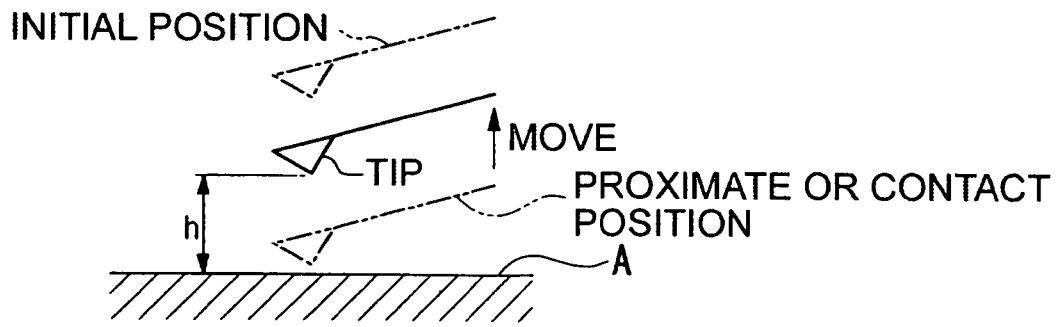
FIG. 9 is a diagram illustrating another example of observation step of a scanning probe microscope according to the invention, depicting the distance relation between the probe tip and the sample surface.
Figure 10:
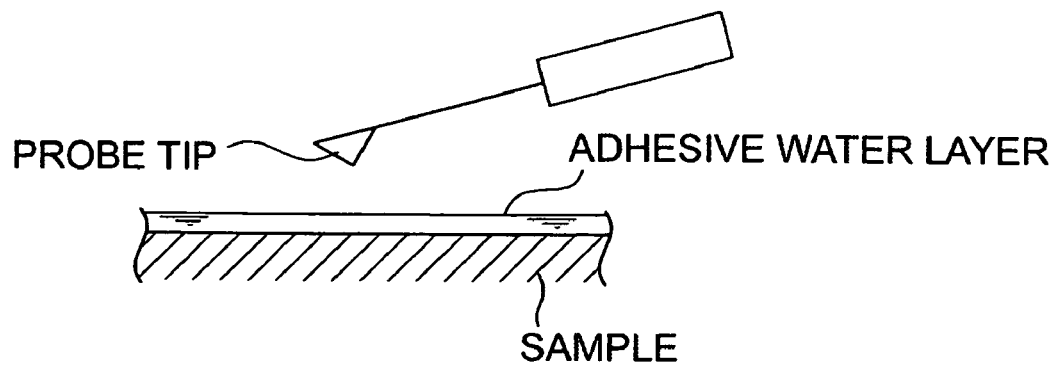
FIG. 10 is a diagram showing the manner in which an adhesive water layer is present on a surface of a sample.
Figure 11:
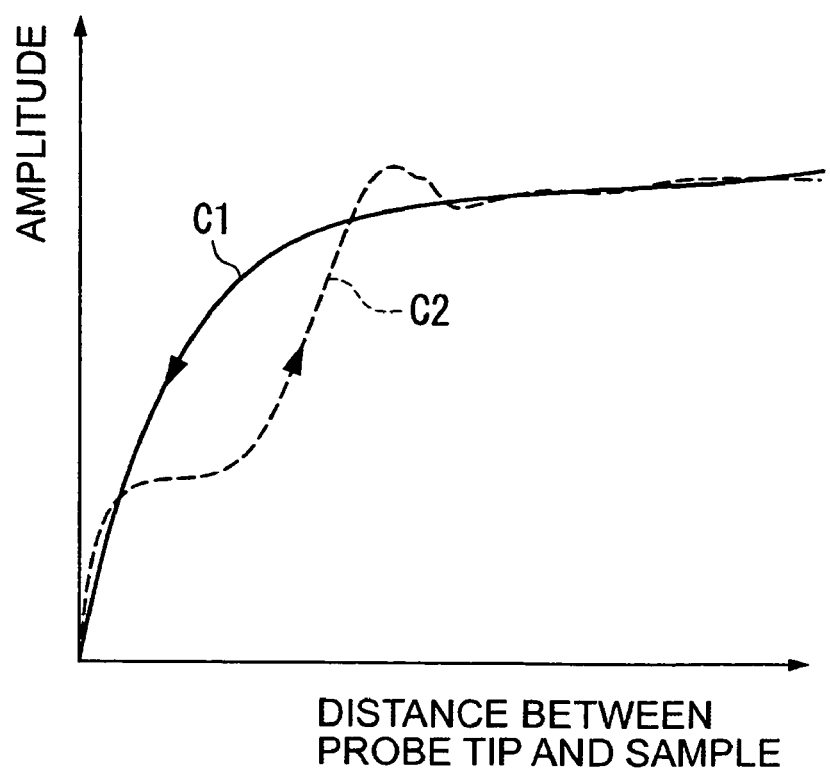
FIG. 11 is a graph showing the relation between the vibration amplitude of a probe tip and the distance to a sample, and in which curve C1 shows variations in the vibration amplitude when the tip is moved toward the sample and curve C2 shows variations in the vibration amplitude when the tip is captured in the adhesive water layer and separated from the sample.

In this case, in a state where the probe tip and sample surface are in proximity or contact with each other, i.e., in a position where the state of vibration of the tip has varied, the observation unit collects observational data. Then, the control unit moves the tip into a position spaced the above-described distance of h from the sample surface as shown in FIG. 9. The observation unit again collects observational data in this position. For example, the distance h is so set that any force such as Van der Waals force is not exerted between the tip and sample.

Where observational data is collected by this scanning probe microscope, the probe tip is placed in proximity or contact with the sample surface. In addition, observational data can be collected in a position spaced the distance h from the sample surface. Therefore, more versatile collection of observational data can be performed, and the sample P can be observed in more detail. Especially, in a position which is spaced the distance h and in which a force such as Van der Waals force does not act, the tip is hardly affected by the topography of the sample. Therefore, if observational data is collected in this position, information about surface characteristics in the direction of height distributed from the sample surface (e.g., three-dimensional distribution of magnetic or electric field) can be obtained more precisely.

Furthermore, the observation unit may collect the same kind of observational data when the probe tip is in proximity or contact with the sample surface (first state) and also when the tip is spaced the distance h from the sample surface (second state). Also, the observation unit may collect different kinds of observational data between the first and second states. Especially, where the same kind of observational data is collected, information about the surface characteristics varying according to the distance from the sample surface can be observed. This scanning probe microscope can collect more effective observational data by performing such observations. Also, the whole observed region of the sample P can be observed versatilely at a time.

Additionally, in the above embodiments, the probe tip is moved by a three-dimensional actuator. The invention is not limited to this method. Since it is only necessary that relative motion be achieved between the probe tip and the sample, the sample may be moved by a three-dimensional actuator. Further, in the above embodiments, the amount of displacement of the probe tip portion is detected using a cantilever of optical detection type. The cantilever is not limited to the optical detection type. For example, a self-detecting type cantilever that detects the amount of displacement of the cantilever itself may be used.

What is claimed is:

1. A scanning probe microscope comprising:
   a probe tip for undergoing a scanning operation to scan a sample surface in X- and Y-directions parallel to the sample surface and for undergoing movement in a Z-direction vertical to the sample surface;
   a vibration unit for vibrating the probe tip at a vibration frequency that resonates with or forcedly vibrates the probe tip;
   an observation unit for collecting observational data from the sample surface at observation positions thereof when the probe tip is in proximity or contact with the sample surface;
   a detection unit for detecting a variation in the state of vibration of the probe tip when the probe tip is in proximity or contact with the sample surface during a scanning operation; and
   a control unit for controlling scanning of the probe tip in the X- and Y-directions and movement of the probe tip in the Z-direction;
   wherein the control unit controls scanning of the probe tip in the X- and/or Y-direction parallel to the sample surface and controls movement of the probe tip only in the Z-direction away from the sample surface after the observational data is collected from an observation position of the sample surface and until the probe tip reaches a next observation position of the sample surface.

2. A scanning probe microscope according to claim 1; wherein the detection unit detects a variation in the state of vibration of the probe tip when the state of vibration of the probe tip has varied beyond a predetermined threshold value during the scanning operation; and wherein the control unit controls the probe tip to move in the Z-direction until a state in which the predetermined threshold value is not exceeded is obtained in response to the detection.

3. A scanning probe microscope according to claim 2; wherein the control unit sequentially stops the scanning of the probe tip when the probe tip has reached a next observation position in the X- or Y-direction during the scanning operation, moves the probe tip a given distance in the Z-direction away from the sample surface, and moves the probe tip in proximity or contact with the sample surface to collect the observational data.

4. A scanning probe microscope according to claim 1; wherein the control unit scans the probe tip after the observational data is collected and the probe tip is moved in the Z-direction away from the sample surface.

5. A scanning probe microscope according to claim 4; wherein the control unit sequentially stops the scanning of the probe tip when the probe tip has reached a next observation position in the X- or Y-direction during the scanning operation, moves the probe tip a given distance in the Z-direction away from the sample surface, and moves the probe tip in proximity or contact with the sample surface to collect the observational data.

6. A scanning probe microscope according to claim 1; wherein the variation in the
state of vibration is at least one of degree of attenuation of the vibration amplitude of the probe tip, degree of variation of a phase of the vibration of the probe tip, and degree of variation in a frequency of the vibration of the probe tip.

7. A scanning probe microscope of according to claim 6; wherein the control unit
sequentially stops the scanning of the probe tip when the probe tip has reached a next observation position in the X- or Y-direction during the scanning operation, moves the probe tip a given distance in the Z-direction away from the sample surface, and moves the probe tip in proximity or contact with the sample surface to collect the observational data.

8. A scanning probe microscope according to claim 1; wherein the control unit sequentially stops the scanning of the probe tip when the probe tip has reached a next observation position in the X- or Y-direction during the scanning operation, and moves the probe tip a given distance in the Z-direction away from the sample surface before moving the probe tip in proximity or contact with the sample surface to collect the observational data.

9. A scanning probe microscope according to claim 8; wherein the given distance is determined based on at least one of the type of the probe tip, the type of the sample, the temperature of the measuring environment, and the humidity of the measuring environment.

10. A scanning probe microscope according to claim 9; wherein the given distance is 1 nm or more.

11. A scanning probe microscope according to claim 9; wherein the given distance is 10 nm or more.

12. A scanning probe microscope according to claim 1; wherein the observation unit collects different kinds of observational data simultaneously.

13. A scanning probe microscope according to claim 12; wherein the observational data consists of two types of data.

14. A scanning probe microscope according to claim 12; wherein the observational data consists of three or more types of data.

15. A scanning probe microscope according to claim 1; wherein in the observation position, the control unit moves the probe tip to a preselected position spaced a given distance from the sample surface in the Z-direction, and wherein the observation unit collects observational data in the preselected position of the probe tip.

16. A scanning probe microscope according to claim 15; wherein when the observation unit collects observational data in the preselected position of the probe tip, the observation unit collects observational data that is identical or different in kind as compared with observational data collected when the probe tip is in proximity or contact with the sample surface.

17. A scanning probe microscope comprising:
a probe tip for undergoing a scanning operation to scan a sample surface in X- and Y-directions parallel to the sample surface and for undergoing movement in a Z-direction vertical to the sample surface;
a vibration unit for vibrating the probe tip at a vibration frequency that resonates with or forcedly vibrates the probe tip;
an observation unit for collecting observational data from the sample surface when the probe tip is in proximity or contact with the sample surface;
a detection unit for detecting a variation in the state of vibration of the probe tip when the probe tip is in proximity or contact with the sample surface during a scanning operation; and
a control unit for controlling scanning of the probe tip in the X- and Y-directions and movement of the probe tip in the Z-direction;
wherein the control unit controls scanning of the probe tip in a direction parallel to the sample surface after the observational data is collected from the sample surface and until the probe tip reaches a next observation position in the X- or Y-direction;
wherein during a scanning operation, the control unit controls the probe tip to move in the Z-direction away from the sample surface only when the detection unit detects a variation in the state of vibration of the probe tip;
wherein the control unit sequentially stops the scanning of the probe tip when the probe tip has reached a next observation position in the X- or Y-direction during the scanning operation, moves the probe tip a given distance in the Z-direction away from the sample surface, and moves the probe tip in proximity or contact with the sample surface to collect the observational data; and
wherein the vibration unit sets the amplitude of the vibration of the probe tip smaller than the amplitude of the vibration of the probe tip during a scanning operation when the tip is brought into proximity or contact with the sample surface and the observational data is collected.

18. A scanning method implemented by a scanning probe microscope having a probe tip capable of scanning in X- and Y-directions parallel to a sample surface and moving in a Z-direction vertical to the sample surface, the probe tip being vibrated at a vibration frequency that resonates with or forcedly vibrates the tip, the scanning probe microscope acting to collect observational data when the probe tip is in proximity or contact with the sample surface, the scanning method comprising the steps of:
scanning the probe tip in the X- or Y-direction;
stopping the scanning of the probe tip when the probe tip has reached an observation position of the sample surface as a result of the scanning;
moving the probe tip in the Z-direction towards the sample surface until the probe tip is in proximity or contact with the sample surface;
collecting observational data from the sample surface at the observation position thereof when the probe tip is in proximity or contact with the sample surface; and
controlling scanning of the probe tip in the X-and/or Y-direction parallel to the sample surface and movement of the probe tip only in the Z-direction away from the sample surface after the observational data is collected from an observation position of the sample surface and until the probe tip reaches a next observation position of the sample surface.

19. A scanning method according to claim 18; further comprising the step of moving
the probe tip in the Z-direction away from the sample surface while the scanning is stopped and after the step of collecting the observational data.

20. A scanning method according to claim 18; wherein during the step of collecting the observational data, the scanning of the probe tip is stopped, and then the probe tip is once moved a given distance in the Z-direction away from the sample surface and then moved in the Z-direction toward the sample surface.

21. A scanning method according to claim 18; further comprising the steps of moving the probe tip to a preselected position spaced a given distance in the Z-direction away from the sample surface, and collecting observational data from the sample surface when the probe tip is in the preselected position.

22. A scanning method according to claim 18; wherein a variation in the state of vibration of the probe tip is detected when the state of vibration of the probe tip has varies beyond a predetermined threshold value during scanning of the probe tip in the X- or Y-direction; and wherein the probe tip is moved in the
Z-direction away from the sample surface in response to the detection until the state of vibration of the probe tip does not exceed the threshold value.

23. A scanning method implemented by a scanning probe microscope having a probe tip capable of scanning in X- and Y-directions parallel to a sample surface and moving in a Z-direction vertical to the sample surface, the probe tip being vibrated at a vibration frequency that resonates with or forcedly vibrates the tip, the scanning probe microscope acting to collect observational data when the tip is in proximity or contact with the sample surface, the scanning method comprising the steps of:
scanning the probe tip in the X- or Y-direction;
stopping the scanning of the probe tip when the probe tip has reached an observation position as a result of the scanning;
moving the probe tip in the Z-direction towards the sample surface until the probe tip is in proximity or contact with the sample surface;
collecting observational data from the sample surface when the probe tip is in proximity or contact with the sample surface; and
moving the probe tip in the Z-direction away from the sample surface only when a variation in the state of vibration of the probe tip is detected during the scanning of the probe tip in the X- or Y-direction;
wherein during the step of collecting the observational data, a variation in the state of vibration of the probe tip is detected, and then the probe tip is once moved a given distance in the Z-direction away from the sample surface, the amplitude of the vibration of the probe tip is set smaller than during the step of scanning the probe tip, and then the probe tip is moved in the Z-direction towards the sample surface.

24. A scanning probe microscope comprising:
a probe tip for undergoing a scanning operation to scan a sample surface in X- and Y-directions parallel to the sample surface and for undergoing movement in a Z-direction vertical to the sample surface;
a vibration unit for vibrating the probe tip at a vibration frequency that resonates with or forcedly vibrates the probe tip;
an observation unit for collecting observational data from the sample surface at observation positions thereof when the probe tip is in proximity or contact with the sample surface;
a detection unit for detecting a variation in the state of vibration of the probe tip when the state of vibration of the probe tip has varied beyond a predetermined threshold value during a scanning operation; and
a control unit for controlling scanning of the probe tip in the X- and Y-directions and movement of the probe tip in the Z-direction so that during a scanning operation, the control unit controls the probe tip to move only in the Z-direction away from the sample surface when the state of vibration of the probe tip has exceeded the predetermined threshold value, and the control unit controls scanning of the probe tip in the X- and/or Y-direction parallel to the sample surface and controls movement of the probe tip only in the Z-direction away from the sample surface after the observational data is collected from an observation position of the sample surface and until the probe tip reaches a next observation position of the sample surface.

25. A scanning probe microscope according to claim 24; wherein the control unit controls scanning of the probe tip in a direction parallel to the sample surface after the observational data is collected from the sample surface and until the probe tip reaches a next observation position in the X- or Y-direction.

26. A scanning method implemented by a scanning probe microscope having a probe tip capable of scanning in X- and Y-directions parallel to a sample surface and moving in a Z-direction vertical to the sample surface, the probe tip being vibrated at a vibration frequency that resonates with or forcedly vibrates the tip, the scanning probe microscope acting to collect observational data when the probe tip is in proximity or contact with the sample surface, the scanning method comprising the steps of:
scanning the probe tip in the X- or Y-direction;
stopping the scanning of the probe tip when the probe tip has reached an observation position as a result of the scanning;
moving the probe tip in the Z-direction towards the sample surface until the probe tip is in proximity or contact with the sample surface;
collecting observational data from the sample surface when the probe tip is in proximity or contact with the sample surface;
detecting a variation in the state of vibration of the probe tip when the state of vibration of the probe tip has varied beyond a predetermined threshold value during scanning of the probe tip; and
moving the probe tip in the Z-direction away from the sample surface during the scanning of the probe tip only when the state of vibration of the probe tip has exceeded the threshold value.

* * * * *